United States Patent
Fredricks et al.

(10) Patent No.: US 6,565,934 B1
(45) Date of Patent: *May 20, 2003

(54) HEAT INSULATING PAPER CUPS

(75) Inventors: Richard E. Fredricks, Appleton, WI (US); Michael A. Breining, Neenah, WI (US); William R. Pucci, Neenah, WI (US); Donald C. McCarthy, Appleton, WI (US); David C. Brown, Clark Summit, PA (US); Richard A. Segan, Nazareth, PA (US); Walter Malakhow, Teaneck, NJ (US)

(73) Assignee: Fort James Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/334,495

(22) Filed: Jun. 17, 1999

Related U.S. Application Data

(63) Continuation-in-part of application No. 09/087,956, filed on Jun. 1, 1998, now Pat. No. 6,129,653, which is a continuation-in-part of application No. 08/870,486, filed on Jun. 6, 1997, now Pat. No. 6,416,829.

(51) Int. Cl.⁷ .......................... B29D 23/00; B65D 81/38
(52) U.S. Cl. ..................... 428/34.2; 229/400; 229/403; 428/36.5; 428/159; 428/349; 428/511; 428/537.5; 493/84; 493/93; 493/95; 493/96; 493/99
(58) Field of Search .................. 428/35.2, 304.4, 428/318.4, 34.2, 35.9, 319.3, 319.9, 36.5, 159, 349, 511, 537.5; 493/84, 93, 95, 96, 99; 229/400, 403

(56) References Cited

U.S. PATENT DOCUMENTS

| | | | | |
|---|---|---|---|---|
| 4,036,675 A | | 7/1977 | Amberg et al. ............. | 156/245 |
| 4,435,344 A | * | 3/1984 | Iioka ......................... | 264/45.1 |
| 4,452,596 A | * | 6/1984 | Clauss et al. ................ | 493/107 |
| 5,145,107 A | | 9/1992 | Silver et al. ............. | 229/1.5 B |
| 5,246,769 A | * | 9/1993 | Murschall et al. .......... | 428/216 |
| 5,363,982 A | | 11/1994 | Sadlier ......................... | 220/441 |
| 5,490,631 A | | 2/1996 | Iioka et al. .................. | 229/403 |
| 5,725,916 A | | 3/1998 | Ishii et al. .................. | 428/34.2 |
| 5,766,709 A | * | 6/1998 | Geddes et al. ............. | 428/35.7 |
| 6,129,652 A | * | 10/2000 | Fredricks et al. ........... | 493/110 |

FOREIGN PATENT DOCUMENTS

| | | |
|---|---|---|
| EP | WO9855281 | 12/1998 |
| JP | 01094341 A | 4/1989 |
| JP | 6-234170 A | 8/1994 |

* cited by examiner

Primary Examiner—Sandra M. Nolan
(74) Attorney, Agent, or Firm—Finnegan, Henderson, Farabow, Garrett & Dunner, L.L.P.

(57) ABSTRACT

A heat insulating paper cup having an improved seal. The cup can include a body member having an inside surface and an outside surface, and a bottom panel member having a upper surface and a bottom surface. The body member is coated (or in some instances partially coated) on its outside surface with a foamed low density polyethylene, and on its inside surface with an unfoamed modified low density polyethylene. The bottom panel member is coated on its upper surface with a foamed or an unfoamed low density polyethylene or foamed or unfoamed modified low density polyethylene. The body member and bottom panel member are oriented and joined to form a heat seal at an interface between a portion of the unfoamed modified low density polyethylene coated on the inside surface of the body member and a portion of unfoamed low density polyethylene or unfoamed modified low density polyethylene coated on the upper surface of the bottom panel member.

5 Claims, 1 Drawing Sheet

HEAT INSULATING PAPER CUPS

The present application is a continuation-in-part of U.S. Ser. No. 09/087,956, filed Jun. 1, 1998, now U.S. Pat. No. 6,129,653, which was a continuation-in-part of U.S. Ser. No. 08/870,486, filed Jun. 6, 1997, now U.S. Pat. No. 6,416,829.

BACKGROUND OF THE INVENTION

This invention relates to heat-insulating paper containers, and more particularly to heat-insulating paper cups used for coffee and other hot or cold beverages.

Several types of heat-insulating cups have been used commercially for hot and cold liquids. Examples include the wide variety of existing polystyrene foam cups. These cups are typically made by adding a foaming agent to a polystyrene resin, casting the mixture into a mold, heating the resin under pressure to foam it, and removing the shaped article from the mold. Such cups have outstanding heat-insulating properties, but require a lot of energy to make, and are costly to dispose of in an environmentally acceptable way.

A variety of paper-based cups have been proposed as environmentally acceptable alternatives to polystyrene containers. Unfortunately, most attempts to produce paper-based heat-insulating cups have proved costly due to the complexity of their manufacturing processes. One example is a cup where the side wall is surrounded by a corrugated heat-insulating jacket. Its process for manufacture involves additional steps of forming the corrugated paper jacket and bonding it to the outer surface of the side wall of the cup. These cups, however, have proved to be aesthetically unappealing and structurally deficient. In this regard, only the ridges of the corrugated jacket contact the body of the paper cup in such a way that the bond between the two is so weak that the cup and jacket easily separate. Also such cups are not easily nested making storage difficult.

Another type of insulating paper cup is that where the cup has a dual cup structure. An inner cup is given a different taper than an outer cup to form a heat-insulting air layer in between the two cups. The two cups are integrated by curling their respective upper edges into a brim. The dual structure adds to manufacturing costs, and the two cups of the structure are prone to separation.

One of the most widely accepted types of heat-insulating paper-based cups include those described in U.S. Pat. No. 4,435,344, and also referred to in U.S. Pat. No. 5,490,631. Those cups have good insulting properties and can be prepared at a relatively low cost. Such cups are fabricated from a body member and a bottom member, both cut from a paper sheet.

For the cups described in the aforementioned U.S. patents, one surface of the body member is coated or laminated with a thermoplastic synthetic resin film, and the other surface of the body member is coated or laminated with the same or different thermoplastic synthetic resin film or an aluminum foil, to thereby foam the thermoplastic synthetic resin film and form a heat-insulting layer on at least one surface of the container, i.e., the outer surface. Water present in the paper is vaporized upon heating during processing, causing the thermoplastic resin film on the outer surface to foam.

Commercial versions of cups prepared according to U.S. Pat. No. 4,435,344 include a body member and a bottom panel member. The body member comprises a paper sheet coated or laminated on one side with a foamed heat-insulating layer of low density polyethylene which entirely covers its outer surface. The inner surface of the body member is covered with an unfoamed film of high density polyethylene. The bottom panel member is laminated on its inner or upper surface with low density polyethylene film. The inside surface of the body member, and the inside surface of the bottom member are coated to prevent penetration of liquid contents into the paper sheet during use. The inside surface of the body member is also coated to ensure that the water in the paper will not evaporate directly into the air atmosphere during heating of the fabricated cup.

For these commercial cups, the film to be laminated on the inner surface of the body member is high density polyethylene because it has a higher softening point than the low density polyethylene film on the outer surface. Upon heating during fabrication, the moisture inherently present in paper sheet serves as the foaming agent for the outer surface layer of low density polyethylene film. The high density polyethylene on the inside surface of the body member will not foam under fabrication conditions but serves to seal the interior of the cup thus preventing an escape of the moisture necessary to foam the low density polyethylene on the outer surface of the cup.

A significant drawback of the aforementioned cups is that they are difficult to adequately seal when fabricated under desirable commercial conditions, i.e., high cup-forming machine speeds. When assembling such cups using conventional cup-forming machines, the bottom panel member and the body member are oriented in such a way that upon folding, heating and sealing the body member inner layer of high density polyethylene and the unfoamed polyethylene inner layer of the bottom panel member are in contact. Applicants have found that when fabricated under high cup-forming machine speeds leaking occurs at this juncture between inner layer of high density polyethylene of the body member, and the unfoamed polyethylene inner layer of the bottom panel member.

One object of the invention, therefore, was to develop a heat-insulating paper cup which does not leak when fabricated under high cup-forming machine speeds. While numerous exotic solutions could be envisioned involving a redesign of the cup structure and/or cup-forming machines, it was a further object of the invention to develop such a cup which could be fabricated still using conventional and existing cup-forming machines. In this regard, it was also an object of the invention to address the leaking problem while maintaining as many of the conventional operating conditions and materials as possible thereby avoiding extensive redesigns of existing mass production operations for commercial cups.

SUMMARY OF THE INVENTION

Applicants have surprisingly found improved seals for the bottoms of heat insulating paper cups at the seam where the body member and bottom panel member are joined during fabrication. These seals include a portion of the bottom panel member paper sheet laminated with low density polyethylene oriented in such a manner to contact the inner layer of the body member coated with a modified low density polyethylene. Upon the application of heat and pressure during fabrication, the two different laminated low density polyethylenes interact to form an effective bonding layer at the interface between the two members.

Accordingly, the invention is directed to a heat insulating paper cup having an improved seal. In an additional embodiment, the cup includes a body member having an inside surface and an outside surface, and a bottom panel member having a upper surface and a bottom surface. The body member is coated (or in some instances partially coated) on its outside surface with a foamed low density polyethylene, and on its inside surface with an unfoamed modified low density polyethylene. The bottom panel member is coated on its upper surface with an unfoamed low density polyethylene or unfoamed modified low density polyethylene. The body member and bottom panel member are oriented and joined to form a heat seal at an interface between a portion of the unfoamed modified low density polyethylene coated on the inside surface of the body member and a portion of unfoamed low density polyethylene or unfoamed modified low density polyethylene coated on the upper surface of the bottom panel member. The modified low density polyethylene is a low density polyethylene modified in a manner effective to provide an improved seal between the bottom panel member and the body member of a cup when fabricated at a speed of at least 165 cups per minute for a 12 ounce cup by a HORAUF MODEL BMP-200 machine, made by Michael Horauf Maschinenfabrik GMBH AND Co KG, with temperature controls set at between about 350° to about 460° C. and a bottom expansion pressure set at about 3000 kilopascals for two revolutions per cup.

An improved seal is a relative characteristic, and for purposes of this invention it is intended to be relative to seals in cups made in the same way except using an inside surface of the body member coated with 100% high density polyethylene. When mass producing cups according to the present invention an improved seal can be obtained using conventional cup-forming machines. When making 12 ounce cups using the HORAUF MODEL BMP-200 (with temperature controls set at between about 350° to about 460° C. and a bottom expansion pressure set at about 3000 kilopascals for two revolutions per cup), for example, sealing can be obtained at higher than normal fabrication speeds such as more than about 165 cups per minute, preferably even about 200 cups/minute or more, which is at least comparable to that obtained with 100% high density cups made at slower, more conventional speeds such as about 165 cups per minute or less. For 12 ounce cups according to the present invention fabricated using the HORAUF MODEL BMP-200 (with temperature controls set at between about 350° to about 460° C. and a bottom expansion pressure set at about 3000 kilopascals for two revolutions per cup), at slower speeds such as about 165 cups per minute or less, there can be a reduction in the number of leaking cups.

The modified low density polyethylene may be a polyethylene blend containing low density polyethylene in an amount effective to provide an improved seal between the bottom panel member and the body member of a cup, and an amount of high density polyethylene or other polyethylene such that the modified low density polyethylene(s) will not foam under conditions of about 240° F. to about 270° F. and a residence time of about 1.5 to about 2.5 minutes, when the cup is subjected to the foaming operation in a forced hot-air oven.

DETAILED DESCRIPTION OF THE PREFERRED EMBODIMENTS

The invention provides a heat-insulating paper cup fabricated from a body member of paper having an inside surface laminate of a polyethylene component effective to prevent penetration of liquid into the paper during use and an outside surface laminate of heat insulating foamed low density polyethylene, said body member bonded to a bottom panel member having a upper surface and a bottom surface, wherein the joined portions of the said bottom panel member and body member form an improved seal in a cup when fabricated at a speed of at least 165 cups per minute for a 12 ounce cup by a HORAUF MODEL BMP-200 machine, made by Michael Horauf Maschinenfabrik GMBH AND Co KG, with temperature controls set at between about 350° to about 460° C. and a bottom expansion pressure set at about 3000 kilopascals for two revolutions per cup.

Figure 1:
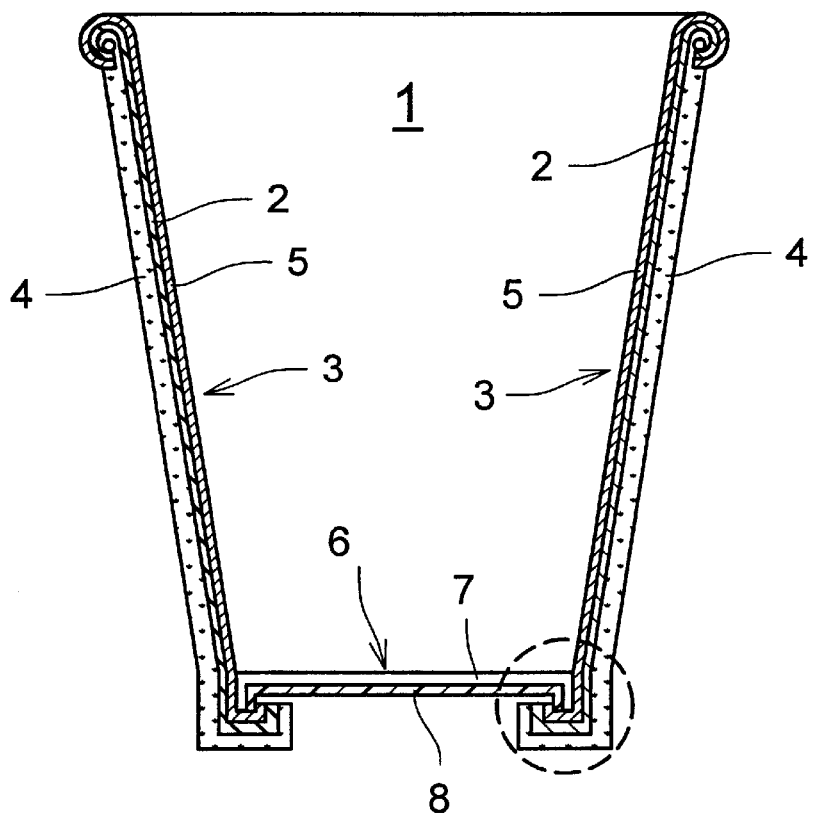
FIG. 1 is a simplified cross-section of an example of a heat-insulating paper cup according to the invention.
Figure 2:
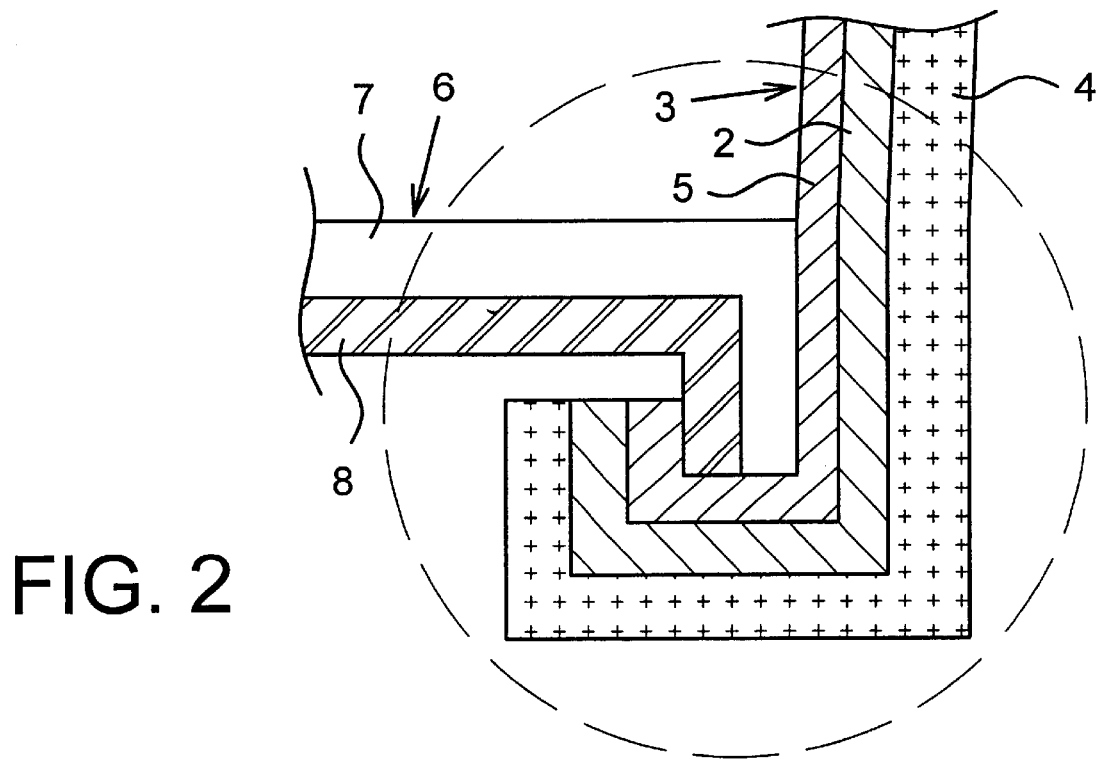
FIG. 2 is an enlarged section of the seal region between the body member and bottom panel member of the cup of FIG. 1.

As noted above, FIG. 1 is a simplified cross-section of an example of a heat-insulating paper cup according to the invention. The cup generally indicated by 1 includes a body member 3 and a bottom panel member 6. The body member 3 comprises a paper sheet 2 laminated on one side with a heat-insulating layer 4 of low density polyethylene which entirely covers its outer surface. The inner surface of the body member is covered with an unfoamed film 5 of modified low density polyethylene. This inner lining 5 of body member 3 provides a seal to prevent the penetration of liquid contents into the paper during use, and, of equal importance, ensures that the water in the paper will not evaporate directly into the air atmosphere when the cup is heated during the foaming operation. If the inside of body member 3 has not been sealed by an inner laminate, water will evaporate through the inside of the cup upon heating, resulting in a foaming failure of the outer surface polyethylene film. It is the moisture inherently present in paper sheet 2 which serves as the foaming agent for the outer surface layer of polyethylene film.

The inner or upper surface of the bottom panel member 6 preferably will be also laminated with a low density polyethylene film 7, although it may also be laminated with a modified low density polyethylene film like the inner surface of the body member. This serves to prevent penetration of the liquid contents of the cup into the paper sheet 8 during use. Preferably, only the inside surface of the bottom panel member 6 is laminated, when it is not important to prevent evaporation of moisture from paper sheet 8 of the bottom panel member 6 during the foaming operation. In fact it is desirable to allow evaporation of moisture from paper sheet 8 when it is not desired to foam the inside of bottom panel member 6. Just like the low density polyethylene film on the outer surface of body member 3, the low density film on the inside of bottom panel member 6 could foam if sufficient moisture was blocked by a backing layer on the outside of the bottom panel member 6.

As noted above, one object of the present invention was to provide a heat-insulating paper cup with improved sealing properties, which could nevertheless be prepared using mostly cost effective materials and machinery. In this regard, low density polyethylene is less expensive than high density polyethylene. Thus, using a modified low density polyethylene containing a predominate proportion of low density polyethylene (rather than 100% high density polyethylene) on the inside surface of the body member is an attractive alternative from an economic standpoint.

The heat-insulating cup can be fabricated by means of conventional cup-forming machines, such as the HORAUF MODEL BMP-200 machine, made by Michael Horauf Maschinenfabrik GMBH AND Co KG. First, the outer surface of a paper sheet for the body member can be extrusion-laminated with a film of low density polyethylene. The inner surface of the paper sheet is laminated with a modified low density polyethylene. A paper sheet for making the bottom panel member is also laminated with a low density polyethylene (or a modified low density polyethylene), on one side. A blank is cut from each of the paper sheets. Using a conventional HORAUF cup-forming machine, the two blanks are fabricated into a container, with the blank for the bottom panel member oriented in such a way that the film laminated side faces upward. The bottom panel member and body member are joined and heat sealed by applying heat and pressure to form the bottom ridge of the cup. Pressure is applied by an expansion roller on the inner bottom rim of the cup. It is preferred that the expansion roller be adjusted to make two revolutions per cup. These cups can be fabricated on automated HORAUF machines at speeds of about 165 cups per minute or more, preferably at least about 180 cups per minute, and more preferably about 200 cups per minute or more, for 12 ounce cups.

A thus-fabricated cup is then subjected to a heat treatment in order to cause moisture in the paper to vaporize, soften the low density polyethylene, and foam the outer surface of the body member. The cups can be heat-treated by being conveyed through an oven. The conveyance of the cups through the oven can be performed by laying the cups en masse usually onto a metal conveyor belt, the cups being in an inverted state, i.e., supported on their rims. Pins can be used to hold the cups in place.

In another embodiment of the invention the inner or upper surface of the bottom panel member is laminated or coated with a low density polyethylene film, as described above, which serves to prevent penetration of the liquid contents of the cup into the paper sheet during use. In this embodiment, however, the inner surface of the body member is covered with e.g., a double- or multi-layer co-extruded laminate or coating of a low density polyethylene film and high density polyethylene film. The low density polyethylene film is on the inner most surface of the body member such that it directly contacts the low density polyethylene film of the inner or upper surface of the bottom panel member when the cup is fabricated, and serves to prevent penetration of the liquid contents of the cup into the paper sheet of the body member during use. Between the low density polyethylene film on the inner most surface of the body member, and the paper sheet of the body member, is the layer of high density polyethylene. This layer serves to prevent evaporation of moisture from the paper sheet of the body member in the direction of the low density polyethylene film on the inner most surface of the body member, and thus serves to prevent that low density polyethylene film from foaming. While perhaps less cost effective in terms of materials than other embodiments of the invention, an advantage of this embodiment and this type of approach is that the compatibility of the two innermost surface materials of the body member and the bottom panel member is further increased thereby increasing bonding and improving leak resistance at the juncture where the bottom panel member and the body member are sealed.

In the above embodiment, the film on the inner most surface of the body member is a low density polyethylene film and the film of the inner or upper surface of the bottom panel member is a low density polyethylene film. It will be understood that any compatible resin can be used provided foaming can be prevented. Likewise, the layer of high density polyethylene is only preferred. Other materials which serve to prevent evaporation of moisture from the paper sheet of the body member in the direction of the inner most layer can be used such as a modified low density polyethylene. Furthermore, when the inner surface of the body member is covered with a double- or multi-layer co-extruded laminate or coating the layers can be thinner than the embodiments where a single layer is used.

There are numerous modifications to the basic process which have been contemplated or used. For example, one or more bottom preheaters have been used, the cup bottom can be installed into the cup after the sidewall heat is applied and sealed by applying heat through the skirt of the bottomstock, and pins can be used during transport through the oven which hold the cup at the top of the curl of the cup. This latter modification is particularly advantageous because there is improved cup control during transfer from cup fabrication to the pins, and the occurrence of bottomstock polyethylene sticking which may result from excessive direct contact of the pins to the bottomstock is minimized.

The thicknesses of the films to be laminated on the body member and bottom panel members of cups according to the invention are not limited to any particular values. However, the thickness of the low density polyethylene on the outer surface of the body member should be of sufficient thickness to provide a desired thickness of heat insulting foam. Suitable thicknesses for such films can be from 25 to 60 $\mu$m. The thickness of the films to be laminated on the inner surfaces of the body member and the bottom panel member need only be so thick as to be sufficient to ensure resistance to liquid permeation during use. The inside laminate should be of sufficient weight (e.g., 10 lb/ream) to prevent staining through the cup sidewall.

The paper sheet used to prepare cups according to the invention can be those conventionally used to prepare cups of this type. They preferably have basis weights in the range of 100 g/m² to 400 g/m². It is also preferable that the paper sheets have a water content of from about 3% to about 10%.

The heating time and temperature for the foaming operation can also be those conventionally used. For example, the temperature can vary from about 240° F. to about 270° F., and the heating time can vary from about 1.5 minutes to about 2.5 minutes.

Any conventional heating means such as hot air, electric heat or microwaves can be used. Heating by hot air or electric heat in a tunnel having transporting means such as a conveyor has the advantage of accomplishing mass production at low cost.

Coating and laminating as used herein have been and are used interchangeably. The low density polyethylenes used herein as coatings or laminates include those polyethylenes that have highly branched and widely spaced chains. Such branched chain polyethylenes are typically characterized as having densities of about 0.910 to about 0.925 g/cm³, crystallinities of about 50–60%, and melting points ($T_{peak}$) in the range of about 100° C. to about 110° C. (about 212° F. to about 230° F.).

Low density polyethylenes can be prepared by conventional methods. For example, such polyethylenes can be prepared by polymerization in a free-radical-initiated liquid phase reaction at about 1500 atm (22,000 psi) and about 375° F., with oxygen as a catalyst (usually from peroxides). Vapor phase techniques are also used by polyethylene manufacturers. These use pressures of only about 100 to about 300 psi at less than about 212° F.

A preferred low density polyethylene is PE 4517 sold by Chevron Chemical Company. PE 4517 is a low density polyethylene extrusion coating resin. It has a melt index of 5.0 gms/10 min. (ASTM test method D1238-62T), and a density of 0.923 g/cc (ASTM test method D1505-60T).

Modified low density polyethylenes include the aforementioned low density polyethylenes blended with enough non-low density polyethylene, such as high density polyethylene, to prevent laminates of the modified low density polyethylenes from foaming when fabricated cups are subjected to the foaming operation. For example, enough high density polyethylene must be present such that a laminate of modified low density polyethylene on the inside surface of the body member of a fabricated cup will not foam under conditions of about 240° F. to about 270° F. and a residence time of about 1.5 to about 2.5 minutes, when the cup is subjected to the foaming operation in a forced hot-air oven. On the other hand, enough low density polyethylene must be present in the blend such that an effective seal is obtained between the body member and the bottom panel member. An effective seal is one which provides an improved seal between the bottom panel member and the body member of a cup when fabricated at a speed of at least 165 cups per minute for a 12 ounce cup by a HORAUF MODEL BMP-200 machine, made by Michael Horauf Maschinenfabrik GMBH AND Co KG, with temperature controls set at between about 350° to about 460° C. and a bottom expansion pressure set at about 3000 kilopascals for two revolutions per cup.

Examples of blends suitable to meet the objectives of the invention include those containing approximately 90% low density polyethylene (10% high density polyethylene), and those containing 10% low density polyethylene (90% high density polyethylene). Such blends have been found not to foam under conditions of about 240° F. to about 270° F. and a residence time of about 1.5 to about 2.5 minutes, when the cup is subjected to the foaming operation in a forced hot-air oven, yet can exhibit an improved seal in a 12 ounce cup fabricated at a speed of at least about 165 cups per minute by a HORAUF MODEL BMP-200 machine, made by Michael Horauf Maschinenfabrik GMBH AND Co KG, with temperature controls set at between about 350° to about 460° C. and a bottom expansion pressure set at about 3000 kilopascals for two revolutions per cup.

The blends can also contain as little as about 2% to about 7% high density polyethylene, although about 10% high density polyethylene is preferred.

High density polyethylenes as used herein include those that have comparatively straight or linear chains which are closely aligned. The physical properties are much different from those of low density polyethylenes because of the increased density. Such linear polyethylenes are typically characterized as having densities in the range of about 0.941 to about 0.965 g/cm$^3$, crystallinities typically characterized in the range of about 90%, and melting points ($T_{peak}$) in the range of about 128° C. to about 135° C. (about 236° F. to about 275° F.).

High density polyethylenes can be prepared by conventional methods such as polymerizing ethylene using Ziegler catalysts at from about 1 to about 100 atm (15 to 1500 psi) at from room temperature to about 200° F.

A preferred high density polyethylene is M3020P, formally "M2004-P", sold by Eastman Chemical Company. M3020P is a high density polyethylene which has a melt index of 9.5 gms/10min. (ASTM test method D1238), and a density of 0.944 g/cc (ASTM test method D4883). M2004-P is a high density polyethylene which has a melt index of 8.4 gms/10 min. (ASTM test method D1238), and a density of 0.945 g/cc (ASTM test method D4883).

While not wishing to be bound by theory, we believe that foaming of the low density polyethylene occurs on the outer surface layer of the container because water, present in the paperboard, vaporizes at approximately the same temperature that low density polyethylene melts (e.g., approx. 105° C. (221° F.)). The molten low density polyethylene crystals then expand to form bubbles because of the water vapor pressure. High density polyethylene, on the other hand, has a much higher melting point (e.g., approx. 130° C. (266° F.)) and is not appreciably affected by water vapor at the temperature at which the water vaporizes (e.g., approx. 105° C. (221° F.)). In choosing a low density polyethylene and a paper sheet, knowing the moisture content of the paper sheet, as well as the heat energy required to melt a particular low density polyethylene, can be important.

A slightly more complex mechanism explains why foaming is not observed when the aforementioned blends of low density and high density polyethylene are used—even when only a relatively small amount of high density polyethylene is blended with the low density polyethylene (relative to the amount of low density polyethylene). We believe that bubble formation is suppressed for those blends because of what we call nucleating effects. During extrusion coating a molten extrudate that is a low density/high density blend, the high density polyethylene component will crystallize first, forming solid particles which act as nucleating sites for low density polyethylene crystals. Small low density polyethylene crystals are then formed by the high density polyethylene-induced nucleation process. When foaming in the oven the extruded low density/high density blend having these small low density polyethylene crystals tends not to foam when foaming the low density polyethylene on the outer surface layer of the container.

Thus, while we have exemplified above high density polyethylene as a non-low density polyethylene to be blended with the low density polyethylene, other modifiers also could be used to prepare the modified low density polyethylene. Other polymers, and even inorganic components, may be used to provide the nucleating effects described above in connection with high density polyethylene. However, polymers are preferred over inorganic components. Accordingly, depending on the low density polyethylene small crystal forming ability of a particular modifier, suitable formulations can be prepared.

Other polymers suitable to provide nucleating sites for low density polyethylene crystals should have higher melting points than the low density polyethylene which is used such that they will crystalize at higher temperatures. Suitable other polymers can be selected, for example, from the group including polypropylenes, poly(ethylene terephthalates), polyesters, polystyrenes, polyolefin clarifying agents, particularly including sorbitol derivatives such as those described in U.S. Pat. Nos. 5,470,898, 4,371,645 and 4,419,473, the contents of which are hereby incorporated by reference, and polyamides such as nylons. See also U.S. Pat. Nos. 5,216,051, 4,845,137, 5,049,605 and 4,016,118, the contents of which are hereby incorporated by reference.

Inorganic components suitable to provide nucleating sites for low density polyethylene crystals can be selected, for example, from the group including talcs, calcium carbonates, titanium dioxides, silicas, diatomaceous earth, kaolin and micas.

The invention will be described further by way of the following examples. It should be understood, however that the invention is not limited to the specific details set forth in the examples.

EXAMPLE 1

Sidewalls for heat insulating paper cups were fabricated with their inside surfaces coated with Chevron PE 4517 low density polyethylene blended with varying amounts of Eastman M2004-P high density polyethylene. For purposes of comparison, one sample was prepared using an inside coating of 100% Eastman M2004-P high density polyethylene, and one sample was prepared using an inside coating of 100% Chevron PE 4517 low density polyethylene. The melting point for the polyethylene components present in each inside surface coating was determined using differential scanning calorimetry (DSC).

Each sidewall sample was heat treated for about 1.5 minutes using a conventional production oven at 270° F. (132° C.). The samples were then examined to determine whether foaming occurred on the inside surface of the sidewall.

| SAMPLE | MELTING POINT (° C.) | SURFACE FOAMING? |
|---|---|---|
| 100% HDPE | 131 | NO |
| 60/40% LDPE/HDPE | 107/125 | NO |
| 70/30% LDPE/HDPE | 107/124 | NO |
| 80/20% LDPE/HDPE | 107/125 | NO |
| 90/10% LDPE/HDPE | 107/123 | NO |
| 100% LDPE | 110 | YES |

EXAMPLE 2

The heat sealabilities were evaluated for 1 inch wide polyethylene coated paper board samples prepared according to Example 1. For each test, the coated side of a sidewall sample was placed in contact with a control bottomstock coated with Chevron 4517 low density polyethylene, and a seal was effected using a Sentinel Heat Sealer Model No. 12ASL (Serial no. 12-1120) available from Packaging Industries, Inc. of Hyannis, Mass. One inch sealing bars covered with Teflon tape were used to effect the seals at a temperature of 300° F. (149° C.) for the top and bottom bars; a jaw pressure of 40 psi; and a dwell time of 0.6 second.

The strengths of the heat sealed samples were then tested using an Model 4202 Instron Tensile Tester available from Instron Corp. of Canton, Mass. Each sealed sample was peeled apart at a 180° angle at a crosshead speed of 1 inch per minute. The peeled samples were then inspected to determine whether the joint failed to exceed the strength of the board (no fiber tear) or exceeded the strength of the board (fiber tear). A fiber tear was indicated by visible paperboard fibers on both peeled surfaces, and was indicative of an improved bond. This heat seal test is representative of effective substantially leak-free cup seals.

| SAMPLE | FIBER TEAR BOND? |
|---|---|
| 100% HDPE | NO |
| 60/40% LDPE/HDPE | YES |
| 70/30% LDPE/HDPE | YES |
| 80/20% LDPE/HDPE | YES |
| 90/10% LDPE/HDPE | YES |
| 100% LDPE | YES |

EXAMPLE 3

Sidewalls for heat insulating paper cups were prepared with outside surfaces coated with a low density polyethylene, and the inside surfaces coated with co-extruded layers of low density polyethylene and high density polyethylene such that the low density polyethylene layers were the outermost surfaces of the inside surfaces of the sidewalls. The bottom stock was coated on the inner or upper surface with low density polyethylene. Cups where fabricated from the aforementioned bottom stock and sidewall material. Good foaming on the outer surface of the body members was achieved.

Although the invention has been described above in terms of preferred embodiments, it is to be understood that variations and modifications may be resorted to as will be apparent to those skilled in the art. Such variations and modifications are to be considered within the purview and scope of the claims appended hereto. For example, the specification refers to improved seals which can be obtained according to the invention using materials effective to obtain such seals. Whether an improved seal exists or can be obtained can be determined by fabricating a twelve ounce cup using a HORAUF MODEL BMP-200 machine, with temperature controls set at between about 350° to about 460° C. and a bottom expansion pressure set at about 3000 kilopascals for two revolutions per cup. This does not mean that the invention is limited to only twelve ounce cups or to cups made by the recited machine using the recited fabrication conditions. Furthermore, the invention is intended to cover all paperboard containers having at least one foamed polyethylene surface (or a portion of the surface is foamed), whether or not they are "cups". Of course the containers or cups may also contain more than one foamed surface as well. Other possible modifications could include the use of hybrid polyethylenes such as the so-called "medium density" polyethylenes (0.926 to 0.940 g/cm$^3$ and $T_{peak}$ of about 115° C.) and "linear low density" polyethylenes ($T_{peak}$ of about 121 to 126° C.).

What is claimed is:

1. A heat-insulating paper container comprising:
    a body member having an inside surface and an outside surface, said body member coated on its outside surface with a foamed low density polyethylene, and coated on its inside surface with an unfoamed multilayer; and
    a bottom panel member having an upper surface and a bottom surface; said bottom panel member coated on at least its upper surface with a low density polyethylene or modified low density polyethylene,
    wherein said body member and bottom panel member are oriented and joined to form a heat seal at an interface between a portion of the unfoamed multilayer coated on the inside surface of the body member and a portion of the low density polyethylene or the modified low density polyethylene coated on the upper surface of the bottom panel member,
    wherein the unfoamed multilayer has at least two layers, wherein the first layer is a bonding layer which contacts the low density polyethylene or the modified low density polyethylene coated on the upper surface of the bottom panel member, the bonding layer being a material that is the same as or compatible with the material coated on the upper surface of the bottom panel member, and wherein the second layer is a sealing layer being a material effective to prevent foaming of the bonding layer.

2. A heat-insulating container according to claim 1, wherein the second sealing layer is a high density polyethylene and the bonding layer is an unfoamed low density polyethylene which contacts and joins with the low density polyethylene or modified low density polyethylene coated on the upper surface of the bottom panel.

3. A heat insulating container according to claim 2, wherein said container is a cup.

4. A heat-insulating container according to claim 3, providing wherein the polyethylene materials are selected to provide an improved seal between the bottom panel member and the body member of a twelve ounce cup fabricated at a speed of 200 cups/minute or more by a HORAUF MODEL BMP-200 machine with temperature controls set at between about 350° to about 460° C. and a bottom expansion pressure set at about 3000 kilopascals for two revolutions per cup.

5. The heat-insulating container according to claim 1, wherein the bonding layer is selected from materials effective to provide an improved seal between the bottom panel member and the body member of a twelve ounce cup fabricated at a speed of 165 cups/minute by a HORAUF MODEL BMP-200 machine with temperature controls set at between about 350° C. and about 460° C. and a bottom expansion pressure set at about 3000 kilopascals for two revolutions per cup.

* * * * *